United States Patent
Lee et al.

(10) Patent No.: US 12,067,226 B2
(45) Date of Patent: Aug. 20, 2024

(54) DIAL CONTROL METHOD AND DIAL CONTROL SYSTEM FOR ELECTRONIC DEVICE

(71) Applicant: ASUSTEK COMPUTER INC., Taipei (TW)

(72) Inventors: Yu-Wei Lee, Taipei (TW); Chung-I Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/076,008

(22) Filed: Dec. 6, 2022

(65) Prior Publication Data

US 2023/0367469 A1 Nov. 16, 2023

(30) Foreign Application Priority Data

May 12, 2022 (TW) .................................. 111117769

(51) Int. Cl.
*G06F 3/04847* (2022.01)
*G06F 3/02* (2006.01)

(52) U.S. Cl.
CPC .......... *G06F 3/04847* (2013.01); *G06F 3/021* (2013.01); *G06F 3/0219* (2013.01)

(58) Field of Classification Search
CPC .................................................. G06F 3/04847
USPC ................ 715/700; 340/407.1; 711/E12.052; 718/106
See application file for complete search history.

(56) References Cited

U.S. PATENT DOCUMENTS

| | | | | |
|---|---|---|---|---|
| 2007/0106457 | A1* | 5/2007 | Rosenberg | G01S 19/48 340/407.1 |
| 2011/0225595 | A1* | 9/2011 | Chujo | G06F 9/5038 718/106 |
| 2012/0030428 | A1* | 2/2012 | Yasufuku | G06F 12/0893 711/E12.052 |
| 2017/0082983 | A1* | 3/2017 | Katzer | G04B 47/068 |
| 2017/0113809 | A1* | 4/2017 | Hodges | F01D 21/003 |
| 2019/0282098 | A1* | 9/2019 | Proud | A61B 5/0022 |

(Continued)

FOREIGN PATENT DOCUMENTS

| | | |
|---|---|---|
| CN | 111782116 A | 10/2020 |
| CN | 113204288 A | 8/2021 |
| TW | 200529061 A | 9/2005 |

*Primary Examiner* — Ruay Ho
(74) *Attorney, Agent, or Firm* — MUNCY, GEISSLER, OLDS & LOWE, PC

(57) ABSTRACT

A dial control method applied to an electronic device is provided. The electronic device has a storage unit configured to store a plurality of functions. The functions comprise a first function and a second function. The first function is a constant function, and the second function is a non-linear function. The electronic device is electrically connected to a dial module, and the dial module rotates to generate rotation data. The dial control method comprises: receiving a selection signal and selecting one of the functions based on the selection signal; receiving the rotation data and calculating a tick number per unit time based on the rotation data; transforming the tick number per unit time into an output tick number based on the selected function; and controlling the electronic device based on the output tick number. A dial control system is further provided.

10 Claims, 5 Drawing Sheets

(56) References Cited

U.S. PATENT DOCUMENTS

2022/0066456 A1* 3/2022 Ebrahimi Afrouzi ........................ B25J 9/1697

* cited by examiner

DIAL CONTROL METHOD AND DIAL CONTROL SYSTEM FOR ELECTRONIC DEVICE

CROSS-REFERENCE TO RELATED APPLICATION

This application claims the priority benefit of Taiwan application serial No. 111117769, filed on May 12, 2022. The entirety of the above-mentioned patent application is hereby incorporated by reference herein and made a part of the specification.

BACKGROUND OF THE INVENTION

Field of the Invention

The disclosure relates to a control method for an electronic device, and in particular, to a dial control method and a dial control system for an electronic device.

Description of the Related Art

With the development of science and technology, users have increasing requirements for the man-machine operation interface of electronic products. Compared with a key switch, a dial provides a user with more diverse operation methods. The user inputs control signals by rotating the dial.

However, the conventional dial generates control signals based on tick numbers, and each tick number represents a unit change, which is not conducive to adjusting functions with large numerical changes, such as volume adjustment and brush width adjustment.

BRIEF SUMMARY OF THE INVENTION

The disclosure provides a dial control method, applied to an electronic device. The electronic device has a storage unit configured to store a plurality of functions. The functions include a first function and a second function. The first function is a constant function, and the second function is a non-linear function. The electronic device is electrically connected to a dial module, and the dial module rotates to generate rotation data. The dial control method includes: receiving a selection signal and selecting one of the functions based on the selection signal; receiving the rotation data and calculating a tick number per unit time based on the rotation data; transforming the tick number per unit time into an output tick number based on the selected function; and controlling the electronic device based on the output tick number.

The disclosure further provides a dial control system, applied to an electronic device. The electronic device is electrically connected to a dial module, and the dial module rotates to generate rotation data. The dial control system includes a storage unit, an operation interface and a control unit. The storage unit is configured to store a plurality of functions, where the functions include a first function and a second function, the first function is a constant function, and the second function is a non-linear function. The operation interface is configured to receive a selection signal. The control unit is configured to select one of the functions based on the selection signal; receive the rotation data and calculate a tick number per unit time based on the rotation data; transform the tick number per unit time into an output tick number based on the selected function; and control the electronic device based on the output tick number.

According to the dial control method and the dial control system in the disclosure, the non-linear function with an amplification effect is selected based on the selection signal to transform the rotation data generated by the dial module into the corresponding output tick number, to be applied to adjust functions with large numerical changes, such as volume adjustment and brush width adjustment, to resolve the disadvantage that a conventional dial is not conducive to adjusting the functions with large numerical changes.

DETAILED DESCRIPTION OF THE EMBODIMENTS

Figure 1:
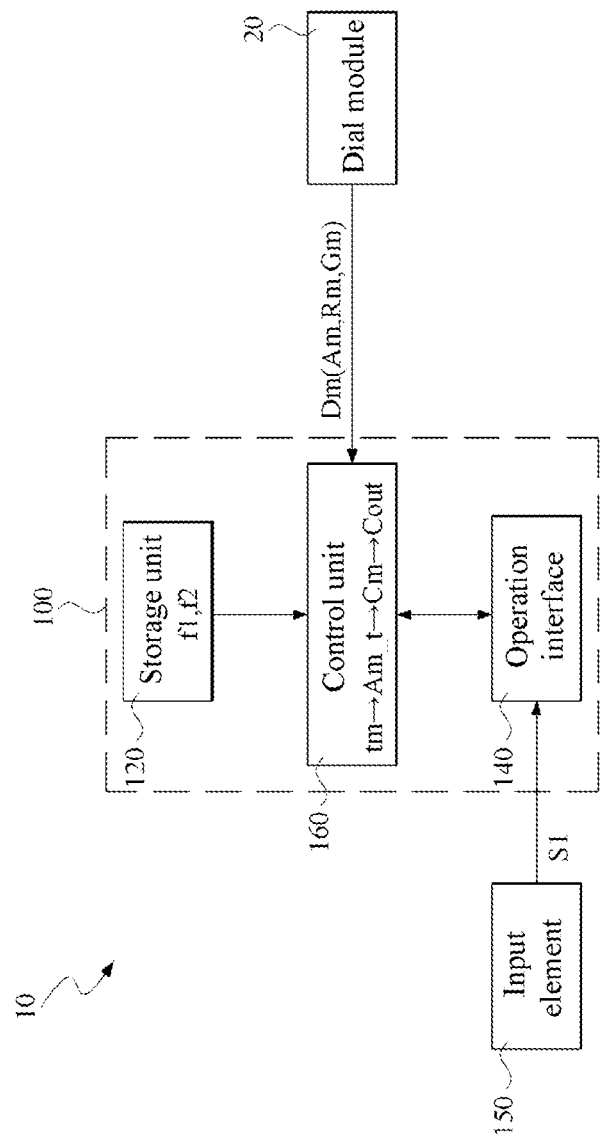
FIG. 1 is a schematic block diagram of an embodiment of a dial control system according to the disclosure.

FIG. 1 is a schematic block diagram of an embodiment of a dial control system according to the disclosure. The dial control system 100 is applied to an electronic device 10, such as a notebook computer, and is configured to process rotation data Dm from a dial module 20. The dial module 20 is an independent device or a module integrated in the electronic device 10.

As shown in FIG. 1, the dial control system 100 includes a storage unit 120, an operation interface 140, and a control unit 160. The storage unit 120 stores a plurality of functions f1 and f2 (FIG. 1 shows two functions f1 and f2 as examples). The two functions f1 and f2 include a first function (i.e. function f1) and a second function (i.e. function f2). The first function is a constant function, and the second function is a non-linear function. In an embodiment, the storage unit 120 is a read-only memory or a random access memory in the electronic device 10.

The operation interface 140 is configured to receive a selection signal S1. In an embodiment, the operation interface 140 receives the selection signal S1 through an input element 150. The input element 150 is a touch panel, a keyboard, a touch display, or the dial module 20. In an embodiment, a user inputs the selection signal S1 by holding the dial module 20 or by tapping a specific position on the touch screen.

In an embodiment, the operation interface 140 includes a dial pattern 142 to simulate a shape of the dial module 20 on a screen, and a user taps the dial pattern 142 on the screen with a cursor to input the selection signal S1. For details, refer to description in FIG. 3 and corresponding paragraphs.

The control unit 160 selects one of the functions f1 and f2 based on the selection signal S1 from the operation interface 140 and receives the rotation data Dm from the dial module 20. The control unit 160 first calculates a tick number per unit time Cm based on the rotation data Dm, and then transforms the tick number per unit time Cm into an output tick number Cout based on the selected function. The output tick number Cout replaces the original rotation data Dm generated by the dial module 20 to control the electronic device 10.

Specifically, the rotation data Dm includes a rotation angle Am, a rotation direction Rm, and a full-turn tick number Gm of the dial module 20. In a case that a unit time tm is given, the control unit 160 calculates a rotation angle per unit time Am_t corresponding to the rotation data Dm based on the rotation angle Am, and then calculates a tick number per unit time Cm corresponding to the rotation data Dm based on the full-turn tick number Gm (tick numbers corresponding to 360 degrees) of the dial module 20.

The control unit 160 is a central processing unit, a microcontroller, or another processing element dedicated to performing such operations in the electronic device 10. The control unit 160 performs the operations based on a software program stored in the storage unit 120 or a software program built in the control unit 160.

A plurality of functions provided according to an embodiment of the disclosure is listed below. The functions are used for transforming the tick number per unit time Cm into the output tick number Cont.

| | |
|---|---|
| $\alpha=1, f(\alpha,Cm)=1$ | First function: |
| $\alpha=2, f(\alpha,Cm)=0.5\times Cm^2-0.9\times Cm+1.5$ | Second function: |
| $\alpha=3, f(\alpha,Cm)=1.75\times Cm^2-3.65\times Cm+2.75$ | Third function: |
| $\alpha=4, f(\alpha,Cm)=1.25\times Cm^2+0.25\times Cm-0.75$ | Fourth function: |
| $\alpha=5, f(\alpha,Cm)=2.5\times Cm^2-0.9\times Cm-1$ | Fifth function: |

$Cout=f(\alpha,Cm)$

Cout is an output tick number, $\alpha$ is a function number, and Cm is the tick number per unit time of the dial module 20.

Figure 2:
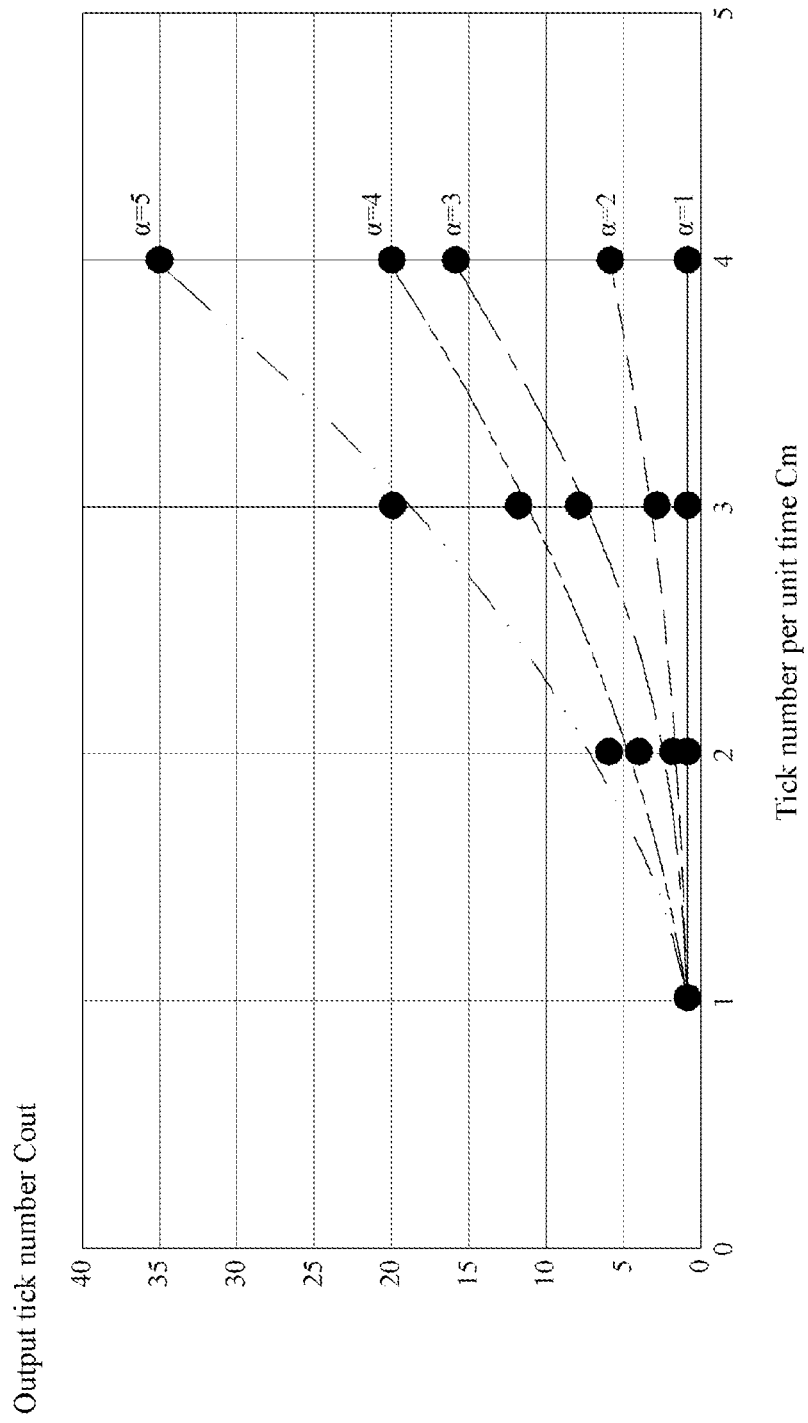
FIG. 2 is a line chart showing transformation results of different selected functions for a tick number per unit time.

FIG. 2 is a line chart showing transformation results of different functions for a tick number per unit time Cm. FIG. 2 shows transformation results of the first function ($\alpha=1$), the second function ($\alpha=2$), the third function ($\alpha=3$), the fourth function ($\alpha=4$), and the fifth function ($\alpha=5$).

The first function is a constant function. In a case that the tick number per unit time Cm is greater than 1, the output tick number Cout transformed based on the first function is always 1. The second function to the fifth function are all non-linear functions, such as quadratic functions, and the second function to the fifth function are different from each other to present different magnification effects.

In a case that the tick number per unit time Cm is greater than 1, the output tick number Cout transformed based on the second function is greater than the tick number per unit time Cm, the output tick number Cout transformed based on the third function is greater than the output tick number Cout transformed based on the second function, the output tick number Cout transformed based on the fourth function is greater than the output tick number Cout transformed based on the third function, and the output tick number Cout transformed based on the fifth function is greater than the output tick number Cout transformed based on the fourth function. However, in a case that the tick number per unit time Cm is equal to 1, the output tick number Cout transformed based on the second function, the third function, the fourth function, or the fifth function is 1 after rounding off. In this way, even if a non-linear function having a significant magnification effect is selected, the dial module 20 is still used for subtle control.

Figure 3:
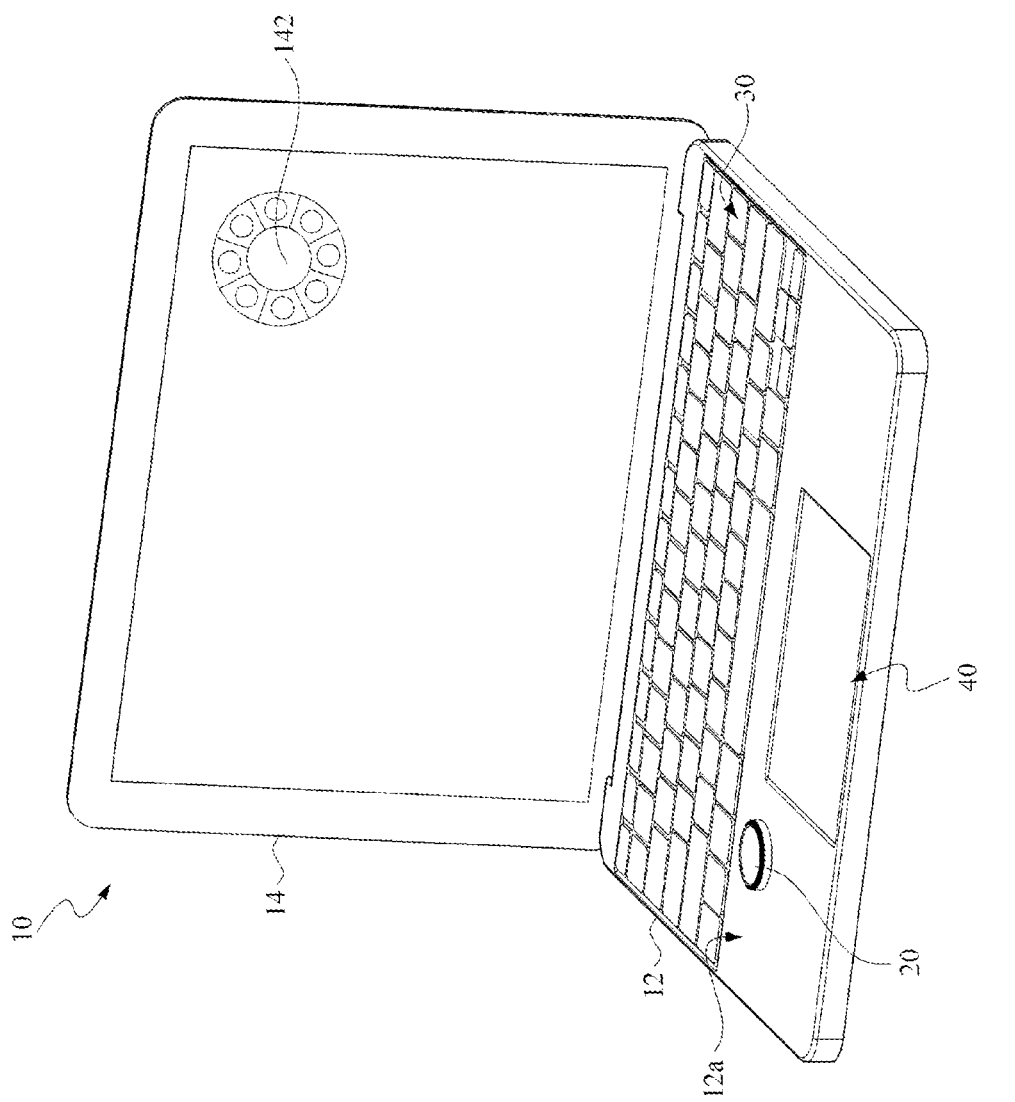
FIG. 3 is a schematic diagram of an electronic device to which the dial control system of FIG. 1 is applied.

FIG. 3 is a schematic diagram of an electronic device 10 to which the dial control system 100 of FIG. 1 is applied. A laptop computer is used as an example in FIG. 3.

As shown in FIG. 3, the electronic device 10 has a host 12 and a screen 14. The host 12 has a working face 12a. The working face 12a is a main working position for a user to operate the electronic device 10. The working face 12a is provided with a keyboard module 30, a touch panel 40, and a dial module 20. The screen 14 is pivotally connected to the host 12 and is configured to present a dial pattern 142 corresponding to the dial module 20 for a user to input a selection signal S1 or other operation signals.

The keyboard module 30 is a mechanical keyboard, an electronic keyboard, or a virtual keyboard. The touch panel 40 is a capacitive touch panel, a resistive touch panel, or an optical touch panel. The dial module 20 is located on the side of the keyboard module 30 facing the touch panel 40, that is, on the lower side in FIG. 3, to facilitate operation by the user. In an embodiment, the dial module 20 is located on the left side of the touch panel 40.

Figure 4:
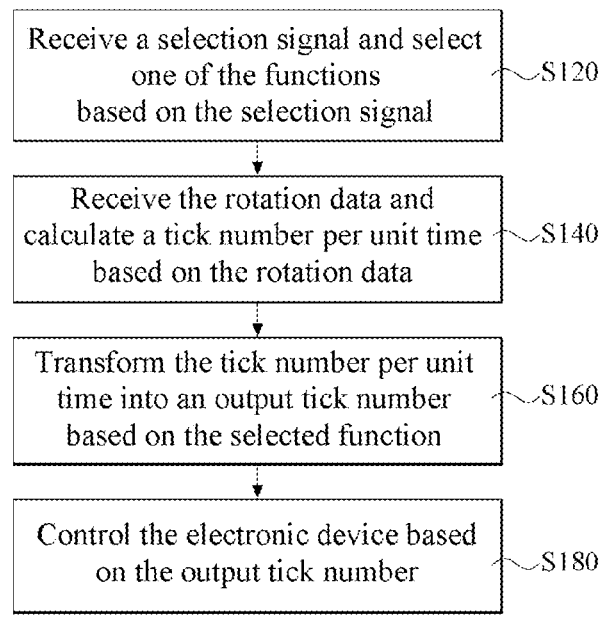
FIG. 4 is a flowchart of an embodiment of a dial control method according to the disclosure.

FIG. 4 is a flowchart of an embodiment of a dial control method according to the disclosure. The dial control method is applied to the dial control system 100 shown in FIG. 1, and has a storage unit 120 configured to store a plurality of functions f1 and f2 and receive rotation data Dm from a dial module 20. The dial control method includes the following steps.

First, as described in step S120, a selection signal S1 is received, and one of the functions f1 and f2 is selected based on the selection signal S1. The two functions f1 and f2 include a first function (i.e. function f1) and a second function (i.e. function f2). The first function is a constant function, and the second function is a non-linear function. Step S120 is performed by the operation interface 140 and the control unit 160 in FIG. 1.

Next, as described in step S140, rotation data Dm is received, and a tick number per unit time Cm is calculated based on the rotation data Dm. Step S140 is performed by the control unit 160 in FIG. 1.

In an embodiment, the rotation data Dm includes a rotation angle Am, a rotation direction Rm, and a full-turn tick number Gm of the dial module 20. Specifically, in a case that a unit time tm is given, a rotation angle per unit time Am_t corresponding to the rotation data Dm is calculated based on the rotation angle Am. Based on the rotation angle per unit time Am_t and the full-turn tick number (tick numbers corresponding to 360 degrees) of the dial module 20, the tick number per unit time Cm corresponding to the rotation data Dm is calculated.

Then, as described in step S160, the tick number per unit time Cm is transformed into an output tick number Cout based on the selected function. Step S160 is performed by the control unit 160 in FIG. 1.

Finally, as described in step S180, the electronic device 10 is controlled based on the output tick number Cout. Step S180 is performed by the control unit 160 in FIG. 1.

Figure 5:
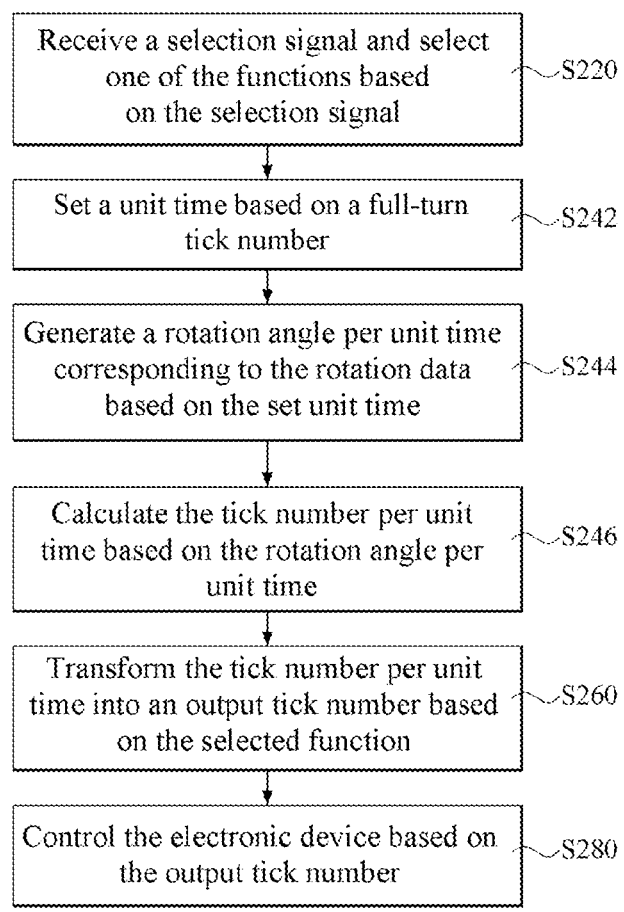
FIG. 5 is a flowchart of another embodiment of a dial control method according to the disclosure.

FIG. 5 is a flowchart of another embodiment of a dial control method according to the disclosure. The dial control method is applied to the dial control system 100 shown in FIG. 1, and has a storage unit 120 configured to store a plurality of functions and receive rotation data Dm from a dial module 20. Steps S220, S260, and S280 of the dial control method are similar to steps S120, S140, and S180 in FIG. 4, and details are not described herein again.

Compared with step S140 in FIG. 4, according to the dial control method in this embodiment, after the function is selected, a unit time is first set based on a full-turn tick number, as described in step S242.

In an embodiment, in step S242, the unit time is calculated based on the following formula.

$tm=tr\times(Gr/Gm),$ tr is a reference unit time, Gr is a reference full-turn tick number, Gm is a full-turn tick number of a current dial module 20, and tm is a unit time set for the current dial module 20.

That is, in step S242, a reference unit time tr and a reference full-turn tick number Gr are preset, and a full-turn tick number Gm of the dial module 20 is compared with the reference full-turn tick number Gr to set the unit time tm corresponding to the current dial module 20.

In an embodiment, if the reference unit time tr is 100 ms, a corresponding reference full-turn tick number Gr is 30. When the received rotation data Dm shows that the full-turn tick number Gm of the dial module 20 is 60, the unit time tm set for the dial module 20 is magnified to 200 ms.

Then, as described in step S244, the rotation angle per unit time Am_t corresponding to the rotation data Dm is calculated based on the set unit time tm.

Then, as described in step S246, the tick number per unit time Cm is calculated based on the rotation angle per unit time Am_t.

According to the dial control method in this embodiment, different unit times tm are set for the dial module 20 with a circle of different tick numbers Gm (or different sensitivities). In this way, even if the dial control method is applied to different dial modules 20, a similar magnification effect is still simulated.

In conclusion, according to the dial control method and the dial control system 100 in the disclosure, a non-linear function with an amplification effect is selected based on the selection signal S1 to transform the rotation data Dm generated by the dial module 20 into the corresponding output tick number Cout, to be applied to adjust functions with large numerical changes, such as volume adjustment and brush width adjustment.

In a case that the tick number per unit time Cm is greater than 1, the output tick number Cout transformed by the non-linear function is greater than the tick number per unit time Cm generated by the dial module 20, to generate the amplification effect, and in a case that the tick number per unit time Cm is equal to 1, the output tick number Cout transformed by the non-linear function is approximately 1.

In this way, the dial control method and the dial control system 100 in the disclosure are applied to adjust the functions with large numerical changes, and subtle control is performed on values based on the dial module 20. In addition, according to the dial control method and the dial control system 100 in the disclosure, a plurality of different functions, including a constant function and a non-linear function, is pre-stored. A user selects a suitable transformation function based on the needs to generate an adjustment value amplification effect, or does not start the adjustment value amplification effect (i.e. select a constant function).

The above are merely embodiments of the disclosure, but are not intended to limit the disclosure. Any person skilled in the art may make equivalent replacements or modifications in any form to the technical means and technical content disclosed in the disclosure without departing from the scope of the technical means of the disclosure. These equivalent replacements or modifications do not depart from the content of the technical means of the disclosure, and shall fall within the protection scope of the disclosure.

What is claimed is:

1. A dial control method, applied to an electronic device, wherein the electronic device has a storage unit configured to store a plurality of functions, wherein the functions comprise a first function and a second function, the first function is a constant function, and the second function is a non-linear function, the electronic device is electrically connected to a dial module, wherein the dial module rotates to generate rotation data, and the dial control method comprises:
   receiving a selection signal and selecting one of the functions based on the selection signal;
   receiving the rotation data and calculating a tick number per unit time based on the rotation data;
   transforming the tick number per unit time into an output tick number based on the selected function;
   controlling the electronic device based on the output tick number; and
   setting a unit time based on a preset reference unit time, a preset reference full-turn tick number, and a full-turn tick number of the dial module,
   wherein said calculating the tick number per unit time based on the rotation data comprises:
      setting a unit time;
      calculating a rotation angle per unit time corresponding to the unit time based on the rotation data; and
      calculating the tick number per unit time based on the rotation angle per unit time, and
   wherein when the tick number per unit time is greater than 1, the output tick number transformed based on the first function is 1, and the output tick number transformed based on the second function is greater than 1.

2. The dial control method according to claim 1, wherein the non-linear function is a quadratic function.

3. The dial control method according to claim 1, wherein the functions further comprises a third function, the third function is a quadratic function, and the third function is different from the second function.

4. The dial control method according to claim 1, wherein when the tick number per unit time is 1, the output tick number transformed based on the first function is 1, and the output tick number transformed based on the second function is 1 after rounding off.

5. The dial control method according to claim 1, wherein the rotation data comprises the full-turn tick number of the dial module, and the step of setting the unit time comprises setting the unit time based on the full-turn tick number of the dial module.

6. The dial control method according to claim 1, wherein the rotation data comprises a rotation angle, a rotation direction, and the full-turn tick number of the dial module.

7. The dial control method according to claim 1, wherein the electronic device comprises a screen, the screen displays an operation interface, and the step of receiving the selection signal is receiving the selection signal through the operation interface.

8. The dial control method according to claim 7, wherein the operation interface includes a dial pattern on the screen to simulate a shape of the dial module.

9. The dial control method according to claim 1, wherein the step of receiving the selection signal is receiving the selection signal through the dial module.

10. A dial control system, applied to an electronic device, wherein the electronic device is electrically connected to a dial module, the dial module rotates to generate rotation data, and the dial control system comprises:
   a storage unit, configured to store a plurality of functions, wherein the functions comprise a first function and a second function, the first function is a constant function, and the second function is a non-linear function;
   an operation interface, configured to receive a selection signal; and
   a control unit, configured to:

select one of the functions based on the selection signal;
receive the rotation data and calculate a tick number per unit time based on the rotation data;
transform the tick number per unit time into an output tick number based on the selected function;
control the electronic device based on the output tick number; and
set a unit time based on a preset reference unit time, a preset reference full-turn tick number, and a full-turn tick number of the dial module,
wherein said calculate the tick number per unit time based on the rotation data comprises:
setting a unit time;
calculating a rotation angle per unit time corresponding to the unit time based on the rotation data; and
calculating the tick number per unit time based on the rotation angle per unit time, and
wherein when the tick number per unit time is greater than 1, the output tick number transformed based on the first function is 1, and the output tick number transformed based on the second function is greater than 1.

* * * * *